United States Patent Office 3,143,001
Patented Aug. 4, 1964

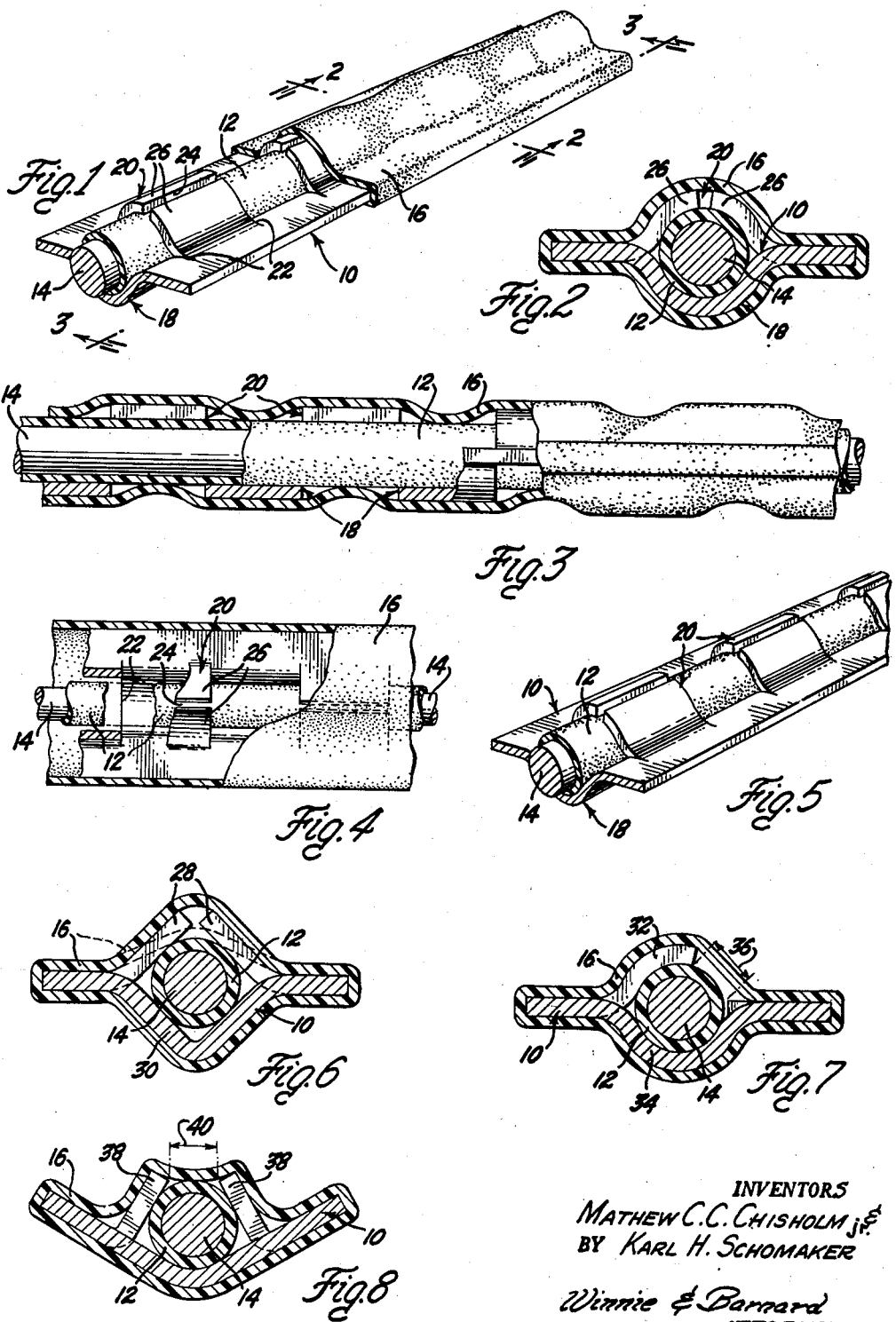
Aug. 4, 1964  M. C. C. CHISHOLM, JR., ET AL  3,143,001
REMOTE CONTROL APPARATUS
Filed June 7, 1961
INVENTORS
MATHEW C.C. CHISHOLM Jr. &
BY KARL H. SCHOMAKER
Winnie & Barnard
ATTORNEYS

3,143,001
REMOTE CONTROL APPARATUS
Matthew C. C. Chisholm, Jr., Lower Gwynedd Township, Montgomery County, and Karl H. Schomaker, Horsham, Pa., assignors to Teleflex Incorporated, North Wales, Pa., a corporation of Delaware
Filed June 7, 1961, Ser. No. 115,479
3 Claims. (Cl. 74—501)

This invention relates to a remote control apparatus. More specifically, the present invention relates to a new and improved type of control apparatus in which a movable control member is supported within a low friction resistance flexible tube for reciprocating or rotating movement and which tube and control member are supported upon a flexible reinforcing strip member.

Flexible remote control devices are in extensive use for transmitting motion from one point to another or between elements of a mechanism and frequently must transmit this motion through a rather tortuous path.

Many such devices are generally available, but are usually wanting in at least two regards. First, such devices which will function satisfactorily over a long period of time and under rather adverse operating conditions are costly. On the other hand, less expensive devices used for this general purpose have normally utilized metal-to-metal contact, therefore, involving high coefficients of friction and, consequently, high breakaway forces. Such metal-to-metal contact also results in a high susceptibility to corrosion whereby utility of the control deteriorates very rapidly.

Typical of the metal-to-metal type construction is a control cable utilizing a closely coiled wire formed to provide a sheath and within which an actuating wire is disposed.

It is a general object of the present invention to provide a control apparatus in which the actuating or moving member is completely supported within a low friction coefficient plastic sleeve. It is a more specific object to provide an apparatus in which an actuating member supporting tube may be simply supported within a stamped reinforcing strip member.

While it is broadly old to support a movable control member within a plastic tube and which tube is in turn supported or surrounded by a protective sheath, such constructions have been costly and hence of limited applicability in installations where inexpensive controls must be used. In the present invention, the reinforcing or supporting strip may be simply stamped to provide an interrupted tunnel construction within which the plastic tube may be contained so as to non-removably retain the tube in position and ready to receive the actuating wire.

It is a still further object of the present invention to provide such a remote control apparatus in which the plastic tube and supporting strip or casing are completely encased in a plastic coating to protect the entire assembly against corrosion and other damage.

Other objects and advantages of the present invention will be apparent from a perusal of the detailed description which follows:

In the drawing:

FIGURE 1 is a perspective view of one modification of the invention with the outer plastic casing partially removed;

FIGURE 2 is a view along line 2—2 of FIGURE 1;

FIGURE 3 is a view along line 3—3 of FIGURE 1;

FIGURE 4 is a broken away plan view of the first modification;

FIGURE 5 is a second modification of the present invention eliminating the outer plastic casing; and FIGURE 6 is a further modification of the present invention.

FIGURE 7 is still another modification of the present invention.

FIGURE 8 is yet another modification of the present invention.

A first modification of the present remote control apparatus is shown in FIGURES 1–4 and generally includes a supporting or base strip 10, a flexible plastic tube 12 secured to the strip, a control link or member 14 movably disposed within the tube, and a plastic sheath or casing 16 enclosing the strip and tube.

It is to be understood that in all modifications of the present invention, the apparatus is to be highly flexible to permit various bending and twisting configurations without seriously limiting the operability of control member 14. Accordingly, the various apparatus components may be made of any materials that are consistent with this basic requirement of flexibility and operability.

In a generally preferred form, base strip 10 and control member 14 are metal. However, it is within the contemplation of this invention that either or both of these members may be formed of other than metal, and, more specifically, may be formed of a suitable plastic material.

It is also important to note that the subject apparatus is a force transmitting device and, further, that operating linkage or member 14 may either transmit a reciprocating or rotary type motion. In either event, the present apparatus is conceived and constructed in such a way as to reduce operating friction to an absolute minimum consistent with a relatively inexpensive construction heretofore unavailable.

Most preferably, operating linkage or member 14 is of a cylindrical configuration and normally will be a solid member. While not shown, it is apparent that the respective ends of member 14 are adapted to be connected to the requisite operating members between which force is to be transmitted. Generally, member 14 is a common small diameter wire and, in some cases, even piano wire has been satisfactorily utilized.

Base or strip member 10 is to be both flexible and shape retentive having the requisite strength and physical characteristics to retain tube 12 in position and also to support the overall apparatus as installed. In a preferred form, strip 10 has been formed from a heat-treated alloy steel which enables the strip to be completely straightened and to provide both high linear strength and maximum ductility. However, it is the physical characteristics of the strip that are important and a material which will provide the characteristics needed in a particular environment will be adaptable for use with the present apparatus.

One of the most important features of the present invention is the provision of a base or strip member which provides the main supporting strength for operating member 14 and yet which can be formed in such a way as to permit a continuous plastic tube to be secured thereto. In the past, a generally analogous apparatus has been achieved only by wrapping a plurality of wires around such a plastic tube. Such previous devices are slower and hence more costly to manufacture than is the present apparatus.

In this case, a tube supporting tunnel is formed centrally of strip 10 by forming oppositely extending and alternating sets of protrusions 18 and 20. In order to form the tube supporting tunnel, strip 10 is first slotted or slit transversely of its longitudinal axis at equally spaced intervals. At the same time, alternate pairs of the transverse slits 22 are connected by a longitudinal slit 24. The strip is now subject to a forming operation in which the first set of protrusions 18 are punched or formed to provide solid or continuous straps, whereas the second set of protrusions 20 is oppositely displaced from the main strip but due to the longitudinal slitting forms a plurality of pairs of openly facing tabs 26. Tabs 26, therefore, form transversely discontinuous tube supporting surfaces or straps.

As thus far formed, a strip or base 10 comprises solid straps or protrusions 18 interspaced between open straps or tabs 26.

Flexible tube 12 is inserted within the strip tunnel through the tab openings after which the tabs are bent over the tube to lock the same in position. If it is desired, it is possible to insert control member 14 within tube 12 prior to the bending of the tabs thereover. In this way member 14 will radially support the softer plastic tube insuring that the tabs 26 in being bent thereover will not create a binding force between the tube and the operating member.

In the modification of FIGURES 1-4, protrusions 18 and 20 are formed so as to provide a generally circular cross-section whereby tube 12 is supported over an appreciable portion of its surface. It is apparent that the particular cross-sectional configuration of the protrusions may be determined by the shape of the punch and dies used to form the same. A particular advantage of the circular cross-sectional configuration is the avoidance of any sharp edges which might otherwise tend to cut outer protective casing 16.

Various modifications of protrusion tab shapes are shown in FIGURES 6-8, in which instances like parts are identified by the same numbers. In the modification of FIGURE 6, the protrusions 28 and 30 are generally straight sided. In the modification of FIGURE 7, protrusions 32 and 34 are again circular in cross-section with a portion of the slotted tab material actually being removed to provide an opening 36.

In the modification of FIGURE 8, tabs 38 are upstruck to provide an opening 40 which is somewhat less than the diameter of the plastic tube 12. In this form of the invention, advantage is taken of the plastic nature of tube 12 which permits the tube to be radially deformed or distended so as to be inserted through tab opening 40 after which the tube will once again assume its normal circular shape. Further, after the tube is in position and upon inserting control member 14, it is apparent that the tube and member will thereafter be locked in position so as to prevent the tube from being forced out of the tab opening. In this form of the invention, no further bending of the tabs is necessary to retain the tube in its proper position.

As already noted, in an important form of the present invention, the entire strip 10 and tube 12 are covered with a sheath or casing 16. In general, sheath 16 protects strip member 10 against corrosion and also prevents tabs 26 from being caught and inadvertently opened.

Sheath 16 is preferably selected to be abrasion, chemical and water resistant as well as tough and flexible. A number of resinous plastic materials have been successfully employed for sheath 16 and include the polyamide resin generally known as "nylon." Other useful embodiments of the sheath have employed polyolefinic resins and particularly the polyolefinic resin generally known as "linear polyethylene." Polyester and polytetrafluoroethylene resins may also be used.

Sheath or casing 16 is extruded over base or strip member 10 with tube 12 in position so that the entire apparatus may be formed as a continuous operation.

Tube 12 may itself be formed generally of the type of plastic materials mentioned with respect to sheath 16. However, it is important that the material selected for use in tube 12 also have a low coefficient of friction.

This is particularly important in order to maintain the frictional drag at an absolute minimum between control member 14 and tube 12. It is one of the considerable advantages of the present apparatus, particularly over previously known types of control apparatus utilizing metal-to-metal contact between the control member and the supporting member, that the present device has an exceptionally low break-away friction load.

A still further modification of the present invention is shown in FIGURE 5. In this modification, the plastic sheath or casing is eliminated. This modification may be utilized when either the base or strip member 10 is formed of a non-corrosive material, e.g., plastic, or where the apparatus is to be utilized in a non-corrosive environment.

It is broadly within the contemplation of the present invention to provide a flexible, low frictional resistance tube, e.g. plastic, mounted on a generally flat flexible base strip which has been formed to provide oppositely offset and longitudinally spaced straps between which the tube is retained. While only straps 18 are illustrated as being continuous, it is possible that both sets, top and bottom, of the straps may be continuous, in which event, the flexible tube is fed in between the strap sets.

It is an advantage of the present control apparatus that lubrication is unnecessary in view of the utilization of a low friction resistance plastic tube within which the operating member is movably supported.

Various structural modifications may obviously be made in the subject invention within the intended scope thereof as set forth in the hereinafter appended claims.

In the claims:

1. A remote control apparatus comprising a flexible strip, a first set of protrusions projecting from one side of said strip and longitudinally spaced therealong to provide transversely continuous supporting surfaces, a second set of protrusions extending from the opposite side of said strip and longitudinally interspaced between said first set of protrusions, said second set of protrusions being longitudinally slotted to provide transversely discontinuous supporting surfaces, said first and second sets of protrusions being longitudinally aligned along the axis of said strip, a flexible tube supported and retained by said first and second set of protrusions, and a control member movably supported within said tube.

2. A remote control apparatus as set forth in claim 1 in which said first and second sets of protrusions are formed of a generally arcuate cross-section and which coact to provide a longitudinally interrupted cylindrical supporting surface for said tube.

3. A remote control apparatus as set forth in claim 1 in which said second set of protrusions comprises a plurality of pairs of transversely aligned tab members, and further in which the inner ends of each pair of tabs are spaced to provide an opening slightly smaller than the external diameter of said tube.

References Cited in the file of this patent

UNITED STATES PATENTS

| | | |
|---|---|---|
| 566,064 | Damon | Aug. 18, 1896 |
| 1,844,519 | Newill | Feb. 9, 1932 |
| 1,848,280 | Statz | Mar. 8, 1932 |
| 2,129,303 | Douglas | Sept. 6, 1938 |
| 2,171,073 | Winning | Aug. 29, 1939 |
| 2,287,968 | Broulhiet | June 30, 1942 |
| 2,338,009 | Peters | Dec. 28, 1943 |
| 2,601,083 | Brouse | June 17, 1952 |
| 2,787,917 | Schroeder | Apr. 9, 1957 |
| 3,063,303 | Cadwallader | Nov. 13, 1962 |

FOREIGN PATENTS

| | | |
|---|---|---|
| 810,770 | France | Jan. 6, 1937 |